United States Patent
Bourgeois et al.

(10) Patent No.: US 10,041,277 B1
(45) Date of Patent: *Aug. 7, 2018

(54) OUTDOOR COOKING APPARATUS

(75) Inventors: Norman R Bourgeois, Jefferson, LA (US); Michael P. Bourgeois, Kenner, LA (US)

(73) Assignee: Metal Fusion, Inc., Jefferson, LA (US)

( * ) Notice: Subject to any disclaimer, the term of this patent is extended or adjusted under 35 U.S.C. 154(b) by 8 days.

This patent is subject to a terminal disclaimer.

(21) Appl. No.: 12/773,522

(22) Filed: May 4, 2010

Related U.S. Application Data

(63) Continuation of application No. 11/370,797, filed on Mar. 7, 2006, now Pat. No. 7,707,929, which is a continuation-in-part of application No. 10/862,553, filed on Jun. 7, 2004, now Pat. No. 7,237,476, and a continuation-in-part of application No. 10/862,601, filed on Jun. 7, 2004, now Pat. No. 7,325,482.

(60) Provisional application No. 60/659,129, filed on Mar. 7, 2005, provisional application No. 60/479,198, filed on Jun. 17, 2003.

(51) Int. Cl.
*A47J 27/00* (2006.01)
*A47J 37/07* (2006.01)
*A47J 37/12* (2006.01)
*E05B 63/12* (2006.01)
*F24C 3/08* (2006.01)

(52) U.S. Cl.
CPC ................... *E05B 63/125* (2013.01)

(58) Field of Classification Search
USPC ............. 99/330, 403, 340, 413, 415, 426; 126/39 R, 40, 373.1–378.1, 385.1
See application file for complete search history.

(56) References Cited

U.S. PATENT DOCUMENTS

| | | | |
|---|---|---|---|
| 1,276,749 A | | 8/1918 | George |
| 1,460,975 A | * | 7/1923 | Miller ............... A47J 27/04 99/340 |
| 1,488,150 A | | 3/1924 | Garibaldi et al. |
| 1,630,787 A | * | 5/1927 | Cullen ........................ 99/416 |
| 1,909,983 A | * | 5/1933 | Powell ........................ 220/529 |
| 2,086,475 A | * | 7/1937 | Powell ............... A47J 36/20 99/403 |
| 2,156,216 A | * | 4/1939 | Russell et al. ............ 219/474 |
| 2,360,026 A | | 10/1944 | Wall |

(Continued)

FOREIGN PATENT DOCUMENTS

| | | |
|---|---|---|
| AT | 217592 | 3/1961 |
| GB | 2205734 A | 12/1988 |

*Primary Examiner* — Steven B McAllister
*Assistant Examiner* — Desmond C Peyton
(74) *Attorney, Agent, or Firm* — Brett A. North

(57) ABSTRACT

An improved outdoor cooking apparatus features a specially configured pot with multiple specially configured cooking inserts and burner frame that supports a burner element. One insert is a rack that can be used for cooking one or more whole poultry carcasses. Another insert is a perforated basket that can be used to hold items to be cooked. The pot has a lower tapered section that includes a tapering downwardly sidewall or walls meeting a smaller, generally rectangular bottom panel. The pot has an upper section with a larger transverse cross section than the pot bottom, preferably comprised of generally vertically oriented side all sections. The basket can be correspondingly shaped to the contour of the pot interior.

18 Claims, 6 Drawing Sheets

(56) References Cited

U.S. PATENT DOCUMENTS

| | | | |
|---|---|---|---|
| 2,555,720 A | 6/1951 | Wiegel | |
| 2,685,862 A | 8/1954 | Hill et al. | |
| 3,053,169 A | 9/1962 | Rappaport | |
| D226,940 S | 5/1973 | Lax | |
| 3,859,505 A | 1/1975 | Herbrand et al. | |
| D237,578 S | 11/1975 | Thomas | |
| 4,106,486 A | 8/1978 | Lee | |
| 4,602,612 A * | 7/1986 | Schwizer | 126/390.1 |
| 4,735,135 A | 4/1988 | Walker | |
| 4,854,227 A * | 8/1989 | Koopman | 99/416 |
| 4,889,972 A * | 12/1989 | Chang | 219/472 |
| 5,065,735 A | 11/1991 | Bourgeois et al. | |
| 5,070,777 A * | 12/1991 | Novak | 99/482 |
| 5,106,642 A | 4/1992 | Ciofalo | |
| 5,189,947 A * | 3/1993 | Yim | 99/415 |
| 5,301,602 A | 4/1994 | Ryczek | |
| 5,307,789 A * | 5/1994 | Newby | F24C 3/14 126/25 A |
| 5,365,833 A * | 11/1994 | Chen | 99/447 |
| 5,402,714 A * | 4/1995 | Deneault et al. | 99/416 |
| 5,442,999 A | 8/1995 | Meister | |
| 5,531,154 A | 7/1996 | Perez, III | |
| 5,665,258 A | 9/1997 | Hsu | |
| 5,673,321 A | 9/1997 | Lee | |
| 5,711,210 A * | 1/1998 | Kaufman | 99/340 |
| 5,758,569 A | 6/1998 | Barbour | |
| 5,813,321 A * | 9/1998 | Bourgeois | A47J 27/04 99/340 |
| D402,155 S | 12/1998 | McDew | |
| 5,896,810 A | 4/1999 | Barbour | |
| 5,913,966 A * | 6/1999 | Arnone et al. | 99/413 |
| 5,970,321 A | 10/1999 | Hively | |
| 5,970,852 A | 10/1999 | Bourgeois | |
| 6,058,830 A * | 5/2000 | Bourgeois | A47J 36/18 126/30 |
| 6,152,023 A * | 11/2000 | Lihotzky-Vaupel | 99/404 |
| 6,196,115 B1 * | 3/2001 | Tsao | 99/339 |
| 6,269,737 B1 * | 8/2001 | Rigney | A47J 27/04 126/369 |
| 6,293,271 B1 * | 9/2001 | Barbour | A47J 27/12 126/25 R |
| 6,314,869 B1 | 11/2001 | Bourgeois, Jr. | |
| 6,360,654 B1 * | 3/2002 | Cornfield | A47J 36/16 220/912 |
| 6,439,107 B1 * | 8/2002 | Bourgeois | A47J 27/04 126/30 |
| 6,698,335 B1 * | 3/2004 | Bourgeois | A47J 27/04 126/30 |
| 6,711,992 B1 | 3/2004 | McLemore | |
| 6,732,636 B1 * | 5/2004 | Germano | 99/411 |
| 6,957,649 B1 | 10/2005 | Bourgeois | |
| 6,964,273 B1 * | 11/2005 | Bourgeois | F24C 3/14 126/2 |
| 7,237,476 B1 * | 7/2007 | Bourgeois | A47J 36/26 99/340 |
| 7,325,482 B1 * | 2/2008 | Bourgeois | A47J 27/00 99/340 |
| 7,412,922 B2 * | 8/2008 | McLemore | 99/413 |
| 7,703,389 B2 * | 4/2010 | McLemore et al. | 99/413 |
| 7,707,929 B1 * | 5/2010 | Bourgeois | A47J 43/18 99/340 |
| 7,766,004 B1 * | 8/2010 | Bourgeois | 126/25 R |
| 2005/0051035 A1 | 3/2005 | Johnston, Sr. | |
| 2009/0049990 A1 * | 2/2009 | Schutte | A47J 36/22 99/339 |
| 2010/0064903 A1 * | 3/2010 | Spence | A47J 27/04 99/415 |
| 2010/0136194 A1 * | 6/2010 | Schutte | A47J 36/22 426/510 |
| 2012/0237647 A1 * | 9/2012 | Dobert | A47J 37/0682 426/243 |
| 2014/0083306 A1 * | 3/2014 | Lee | A47J 36/20 99/413 |
| 2015/0313411 A1 * | 11/2015 | Millikin | B65D 43/02 99/410 |

* cited by examiner

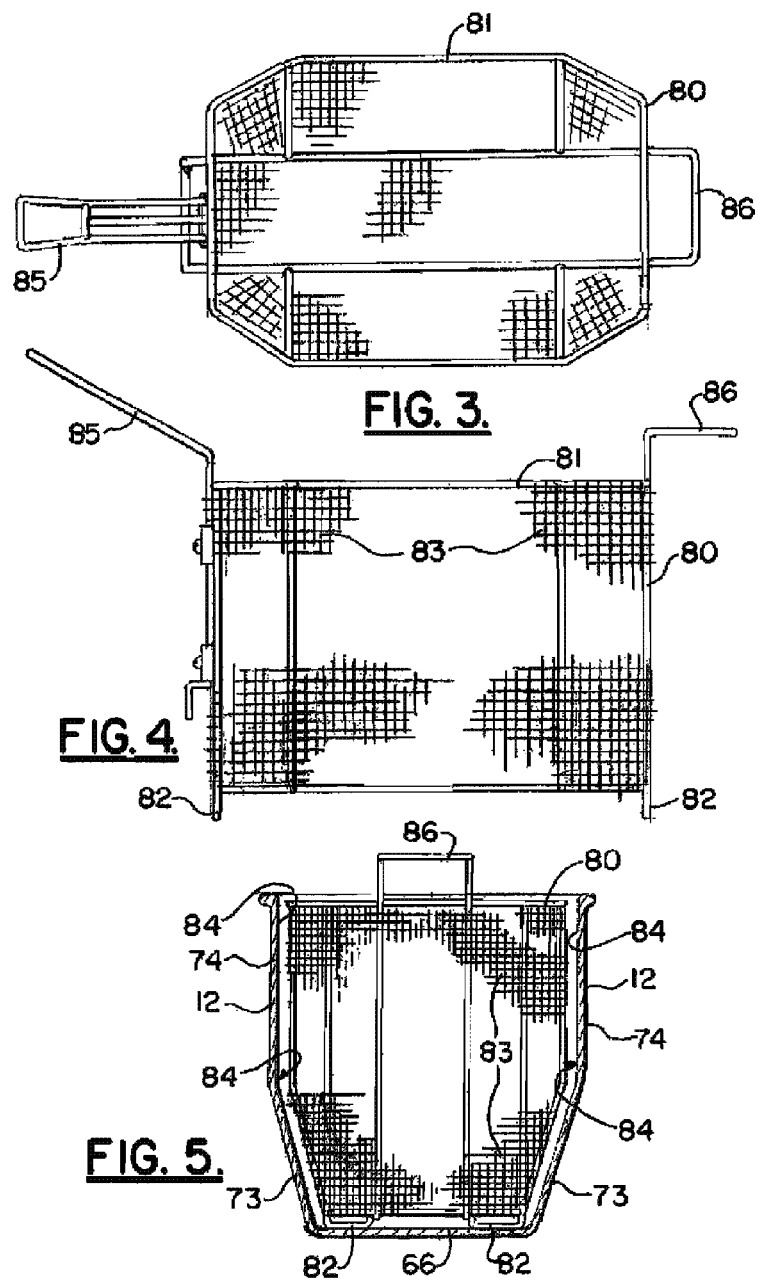

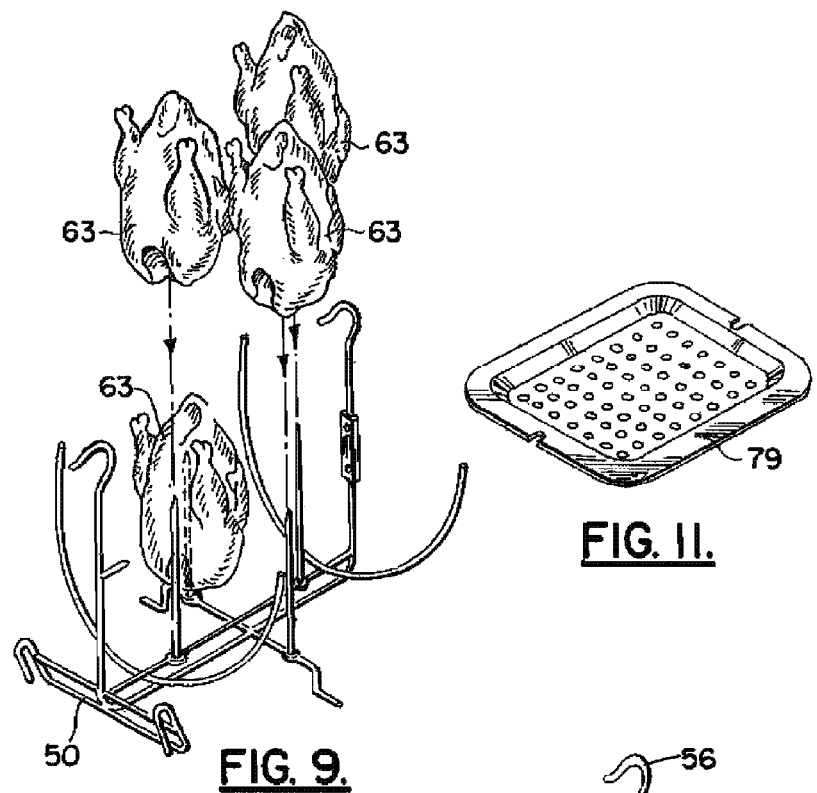
FIG. 9.
FIG. 11.
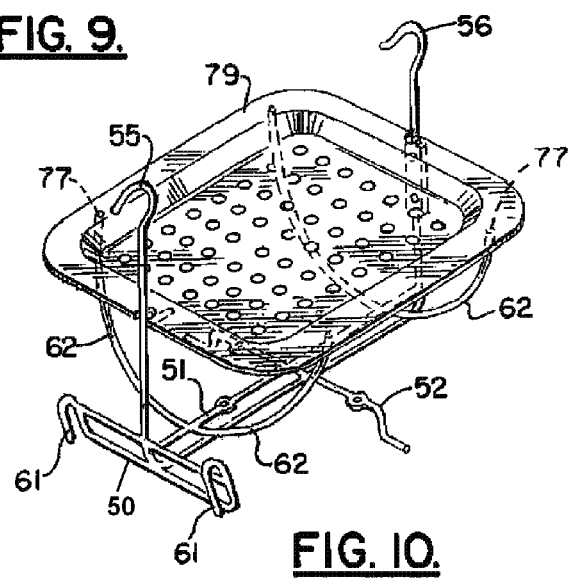
FIG. 10.

OUTDOOR COOKING APPARATUS

CROSS-REFERENCE TO RELATED APPLICATIONS

This is a continuation of U.S. patent application Ser. No. 11/370,797, filed Mar. 7, 2006, now U.S. Pat. No. 7,707,929, which is a continuation-in-part of U.S. patent application Ser. No. 10/862,553, filed Jun. 7, 2004 now U.S. Pat. No. 7,237,476 and U.S. patent application Ser. No. 10/862,601, filed Jun. 7, 2004 now U.S. Pat. No. 7,325,482.

Priority of U.S. Provisional Patent Application No. 60/659,129, filed Mar. 7, 2005, is hereby claimed.

Priority of U.S. Provisional Patent Application No. 60/479,198, filed Jun. 17, 2003, is hereby claimed.

All of these prior applications and patent are hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices that are fueled with gaseous fuel (e.g. propane, butane) and more particularly to an improved outdoor cooking device that can be used in a number of different cooking situations including boiling, steaming, and with water or oil as a cooking medium. Even more particularly, the present invention relates to an improved cooking apparatus that has a specially shaped pot and one or more food holding inserts that can optionally be placed inside the pot. The inserts can include a specially configured insert can hold one or more entire poultry carcasses (e.g. turkey, chicken, etc.).

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters. Examples of these prior art type outdoor cooking devices can be seen in the brochure of Metal Fusion, Inc., of Jefferson, La. and at the website www.kingkooker.com.

Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include U.S. Pat. Nos. 5,813,321; 5,970,852; and U.S. Pat. Nos. 6,058,830; 6,314,869; 6,439,107; 6,698,335; 6,957,649; and 6,964,273, each said Bourgeois patent hereby incorporated herein by reference.

For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are apertured longitudinally for receiving a knife to cut food within the tube member.

Patents issued to Barbour (U.S. Pat. Nos. 5,758,569 and 5,896,810) disclose a cooking apparatus directed to the frying of poultry items such as turkeys.

Various patents have issued for cooking vessels or pots. Examples include U.S. Pat. No. 1,276,749 entitled "Cooking Utensil." A similar device can be found in U.S. Pat. No. 1,488,150 entitled "Steaming and Draining Vessel."

A cooking rack is disclosed in U.S. Pat. No. 2,360,026. A combined cooker and steamer is seen in U.S. Pat. No. 2,555,720. An electrically heated boiler is seen in U.S. Pat. No. 3,859,505. The Lee U.S. Pat. No. 4,106,486 discloses a perforated inner pan that nests completely in a nonperforated open top pan. That U.S. Pat. No. 4,106,486 is entitled "Cooking Utensil."

The McLemore U.S. Pat. No. 6,711,992 discloses a fryer, boiler and steamer cooking apparatus.

Another frying apparatus shown in the Johnston Patent 2005/0051035.

Design Pat. D226,940, D237,578, and D402,155 disclose various cookers or fryers.

BRIEF SUMMARY OF THE INVENTION

The present invention provides an improved outdoor cooking apparatus that includes a burner frame having upper and lower end portions, wherein the lower end portion is configured to engage an underlying support surface, the upper end portion providing a pot support.

A burner element is mounted on the frame for providing a flame to be used during cooking. A specially configured pot rests upon the pot support during cooking, the pot having a generally square or rectangular bottom panel of a first, smaller area, a plurality of sidewalls, an open top of a second, larger area, a pot rim, and an interior for holding a cooking fluid. The pot sidewalls include lower inclined walls that extend upwardly from the bottom panel.

One or more inserts or racks are provided that are sized and shaped to fit the pot interior. Each insert or rack optionally rests upon the pot bottom panel in a cooking position and can be attached to the pot rim in a draining position. One of the racks is a poultry cooking insert that can hold an entire poultry carcass (for example turkey, chicken, or a plurality of poultry carcasses). The rack preferably extends above the bottom panel when cooking and extends laterally beyond the bottom panel. This configuration is particularly useful when frying large poultry items (such as a turkey), minimizing the volume of frying medium (e.g. peanut oil) that is required.

Another rack that can be placed in a cooking medium within the pot interior is a perforated basket for frying items such as fish, poultry, vegetables or the like. Two frying baskets could be placed inside the pot in a side-by-side position or configuration.

The apparatus of the present invention can be used to steam items when a steamer plate is placed above and supported by the poultry cooking insert.

The present invention can be used with more than one cooking medium, such as with oil or with water. Water is preferably used when steaming, or when cooking certain seafood items that are boiled such as shrimp or crabs. An oil cooking medium is used when frying certain items such as poultry, fish, or vegetables.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a top partial perspective view of the preferred embodiment of the apparatus of the present invention showing the pot liner;

FIG. 4 is a partial side view of the preferred embodiment of the apparatus of the present invention illustrating the pot liner;

FIG. 5 is a partial end view of the preferred embodiment of the apparatus of the present invention illustrating the pot liner;

FIG. 9 is a partial perspective view of the preferred embodiment of the apparatus of the present invention showing the optional pot insert rack;

FIG. 10 is a partial perspective view of the preferred embodiment of the apparatus of the present invention showing the optional pot insert rack; and FIG. 11 is a partial perspective view of the preferred embodiment of the apparatus of the present invention showing the steamer plate that can optionally be used with the rack of FIGS. 8-10.

DETAILED DESCRIPTION OF THE INVENTION

Figure 6:
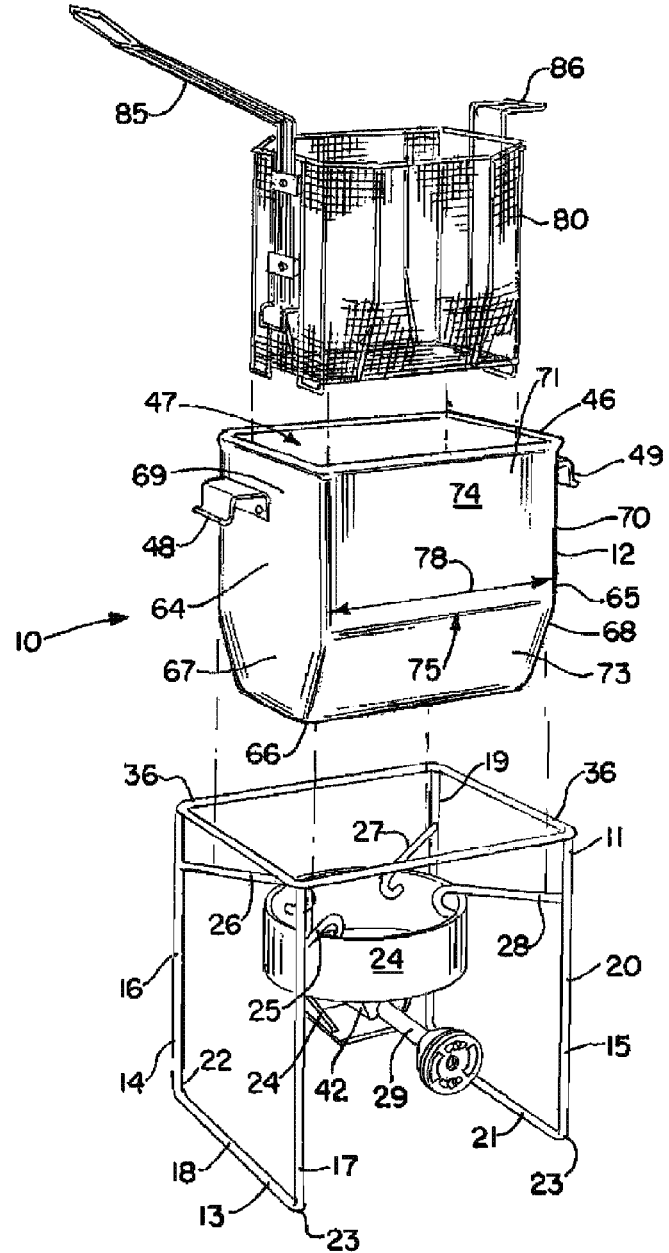
FIG. 6 is a perspective view of the preferred embodiment of the apparatus of the present invention.
Figure 7:
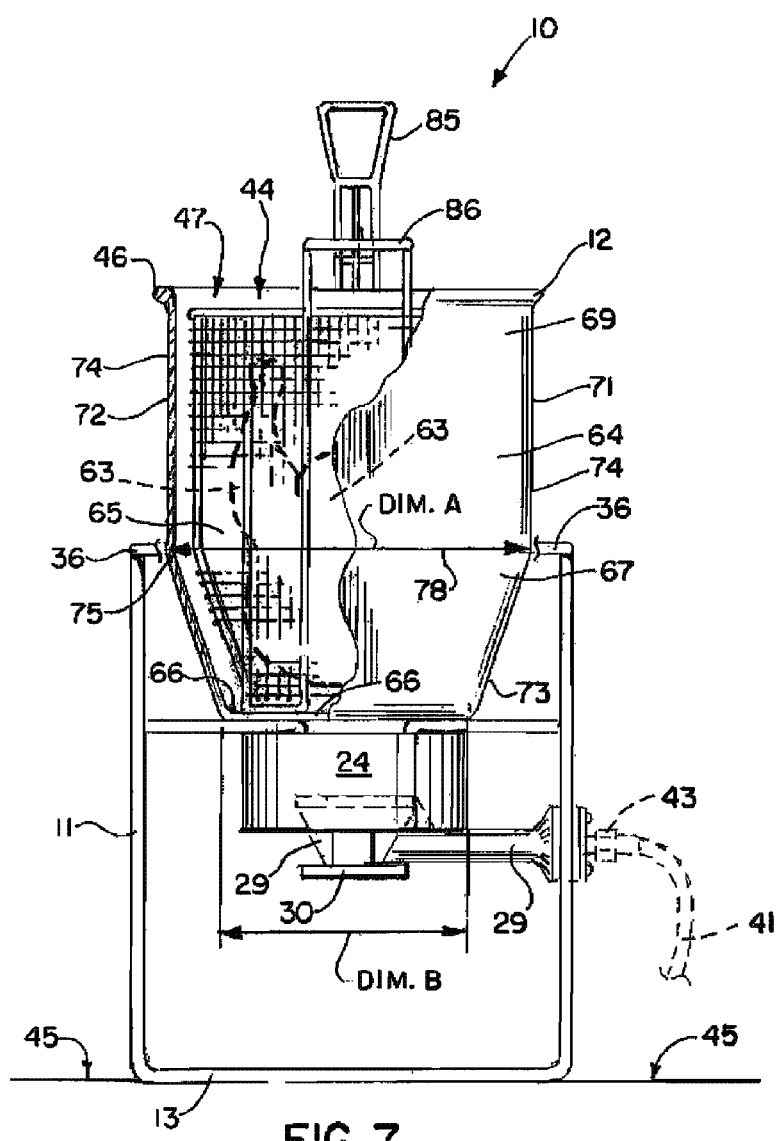
FIG. 7 is a partially broken away side elevation view of the preferred embodiment of the apparatus of the present invention.

FIGS. 1-7 show the preferred embodiment of the apparatus of the present invention which is designated by the numeral 10 in FIGS. 6 and 7. Outdoor cooking apparatus 10 provides a burner frame 11 for supporting a pot 12. The burner frame 11 has a base 13 for engaging an underlying support surface such as a concrete slab 45. Frame 11 includes a pair of u-shaped legs 14, 15. The leg 14 is comprised of a pair of vertical sections 16, 17 connected to a horizontal section 18 at bends 22, 23. Similarly, leg 15 has a pair of spaced apart vertical sections 19, 20 connected to a horizontal section 21. Likewise, bends 22, 23 can be used to connect the horizontal section 21 to the vertical sections 19, 20.

Figure 1:
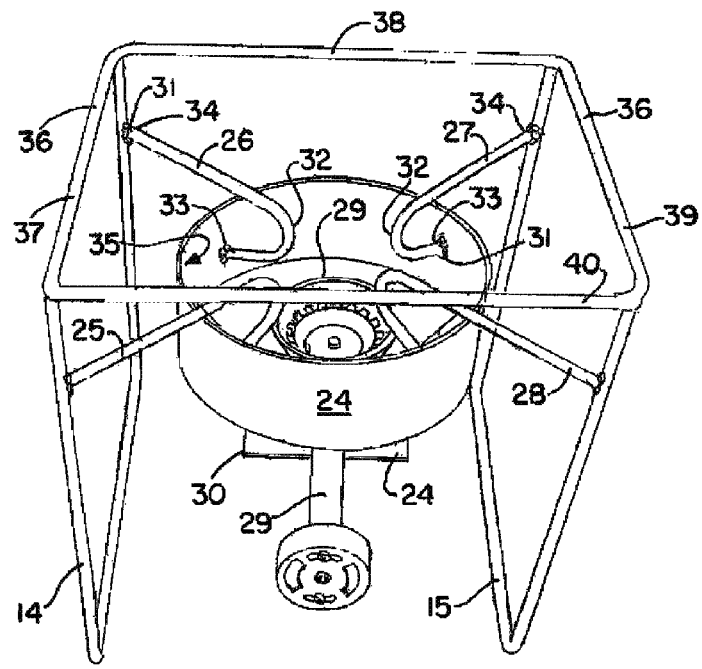
FIG. 1 is a perspective view of the preferred embodiment of the apparatus of the present invention.
Figure 2:
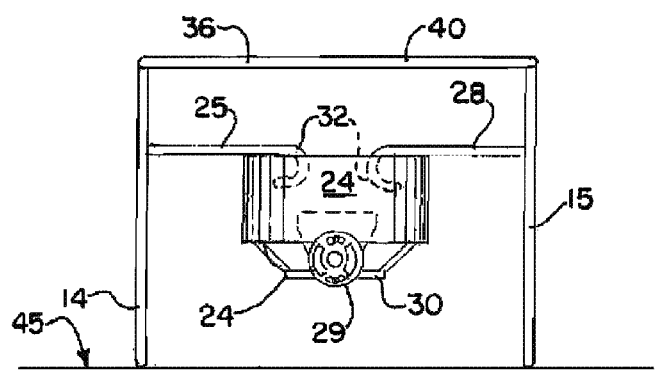
FIG. 2 is a partial front elevation view of the preferred embodiment of the apparatus of the present invention showing the pot.

A shroud or wind guard 24 is connected to each of the legs 14, 15 with a plurality of grate members 25, 26, 27, 28. A burner element 29 is supported just below the shroud 24. The shroud 24 can be generally cylindrically shaped as shown. A burner support bracket or bar 30 can be attached to the bottom of shroud 24 as shown in FIGS. 2 and 4. The burner support bar or bracket 30 can be used to support the burner element 29 near the bottom the shroud 24. Burner element 29 can be a commercially available element, and can be fastened at 42 (FIG. 6) to support bracket 30 using a bolted connection.

Each grate member 25, 26, 27, 28 can be generally hook shaped, providing a bend 32 that connects grate end portions 33, 34. The end portion 33 connects to shroud 24 with a connection such as a weld 31. The end portion 34 of each grate member 25, 26, 27, 28 connects to a leg 15 or 16 with a connection such as a weld 31. In the preferred embodiment, the connection of end 33 to shroud 24 can be a weld 31 to the inner cylindrical surface 35 of shroud 24.

Frame 11 includes a rectangular upper section 36. This rectangular upper section 36 can be defined by a plurality of four horizontal bars 37, 38, 39, 40. The bars 37, 38, 39, 40 can be welded end to end, or can be a single bent bar that forms a rectangle as shown in FIG. 5. The rectangular upper section 36 can then be welded to legs 14, 15 at the corners of rectangular upper support 36 as shown in FIG. 5.

Burner element 29 can be a commercially available cast iron burner element such as the type that are used in hot water heaters. These burner elements 29 can be either high pressure or low pressure depending upon the amount of heat that is to be generated during cooking. A fuel source such as a commercially available canister of butane or propane can be used to fuel burner element 29, connected thereto using a hose 41, regulator (not shown), and an inlet fitting 43 in a manner that is known in the art.

In FIGS. 3-7, pot 12 includes a pot rim 46, a pot interior 47, a plurality of wall panels, and can include a liner 80. Handles 48, 49 can be welded to end panels 64, 65. When pot 12 has cooled, handles 48, 49 enable the pot to be moved. Pot 12 includes bottom panel 66, end panels 64, 65 and side panels 71, 72. The pot 12 provides an open top 44 into which an item to be cooked (such as a poultry carcass 63) can be inserted.

End panels 64, 65 each include a lower trapezoid shaped section and an upper rectangularly shaped section. The end panel 64 has a lower trapezoid section 67 and an upper rectangular section 69. Similarly, the end panel 65 provides a lower trapezoid shaped section 68 and an upper rectangular section 70. Each side 71, 72 has an inclined lower panel 73 and an upper generally vertically oriented panel 74. A horizontal seam 75 defines the intersection between inclined panel 73 and vertical panel 74 for each side 71, 72.

In FIG. 7, the dimension "A" line 76 indicates the width of pot 12 at seams 75, measured from one seam 75 to the other seam 75. In FIG. 6, the dimension line 78 indicates the length of pot 12 at seam 75. The combination of the dimension lines 76 and 78 define a larger transverse cross sectional area of pot 12 next to the seams 75 that can be about equal to the area of open top 44. A second, smaller transverse cross sectional area is defined by bottom panel 66. During use, pot 12 is laterally restrained the bars 37, 38, 39, 40 of frame 11. The larger transverse cross sectional area of pot 12 at seams 75 as defined by dimension arrows 76 and 78 is positioned next to rectangular upper section 36.

This improved configuration places the larger transverse cross sectional area of the pot 12 next to rectangular upper section 36 to prevent or restrain lateral movement of the pot during cooking. The smaller bottom panel 66 in combination with the inclined panels 73 minimizes the volume of typically expensive cooking oil that is required for cooking the poultry carcass 63.

Figure 8:
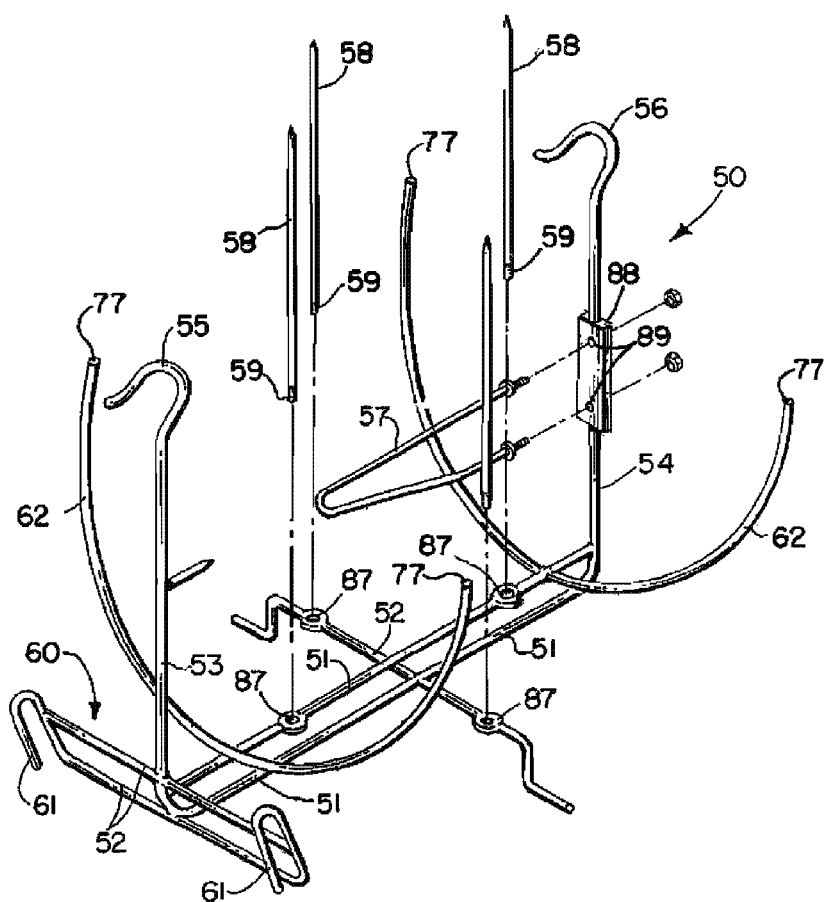
FIG. 8 is a partial perspective view of the preferred embodiment of the apparatus of the present invention showing the optional pot insert rack.

Different food holding inserts can be placed in pot 11, such as the rack insert 50 (FIGS. 8-11) or the basket (FIGS. 3-7). Insert 50 is comprised of longitudinal beam or beams/members 51 and one or more transverse beams/members 52. Vertical beams 53, 54 have lifting hooks 55, 56 respectively. Beam 54 can have a thickened section that provides openings 89 enabling skewer 57 to be bolted to member 54 as shown in FIG. 8.

One or more generally vertically oriented skewers 58 can be removably (e.g. threaded connection) attached to beam 52 at internally threaded opening 87. Each skewer 58 has a threaded lower end 59 with threads that engage correspond threads of an opening 87. When attached to openings 59, the skewers 58 can be used to support one or more smaller poultry carcasses (e.g. chickens) 63 (see FIG. 9). In this fashion, either skewer 57 or skewers 58 can be attached to rack 50. Skewer 57 is typically used to skewer a horizontally positioned turkey or other larger poultry carcass 63 by occupying a part of its body cavity.

Curved supports 62 help cradle and support a turkey or poultry carcass 63 during cooking when insert 50 rests upon bottom panel 66 of the pot 12. Spaced apart curved members 62 enable a larger poultry carcass (e.g. turkey) 63 to be supported as the carcass 63 rests in a horizontal position upon members 51 and cradled by curved members 62. Hanger 60 can be formed using a pair of transverse beams 52 and preferably two spaced apart, downwardly extending hooks 61 that connect to beams 52 as shown in FIG. 4. Hooks 61 engage a pot end panel 64 or 65 at the periphery next to open top 44 when a poultry carcass is to be drained of excess oil after cooking.

An elongated bar (not shown) can engage hooks 55, 56 and thus be used to lift insert 50 and carcass 63 from pot 12 after cooking in a selected cooking medium (e.g. peanut oil). For draining, insert 50 can be centered roughly over bottom panel 66 but at an elevated position on rim 46 next to open top 44 wherein hanger 60 hooks 61 engage the upper edge of an end panel 64 or 65. Hooks 61 can be mounted at an angle relative to beams 51 so that the carcass 63 is positioned to drain excess cooking oil back into the pot 12 when rack 50 is attached to pot 12 at pot rim 46.

FIGS. 10 and 11 show an optional perforated steamer plate 79 that rests upon the upper ends 77 of curved members 62 and in between vertical members 53, 54 (see FIG. 11). Items to be steamed can be placed upon plate 79 and a water level maintained in pot 12 that is below the level of plate 79.

Another food holding insert 80 can be employed with pot 12 instead of or interchangeably with insert 50. Insert 80 is a wire basket shape to conform to the contour 84 of the pot interior. The wire frame 81 can be shaped to conform to the inside contour 84 of pot 12, then covered with wire cloth 83 so that basket insert 80 will hold food items such as a poultry carcass 63. Basket insert 80 can be provided with feet 82 that space the wire cloth 83 (and any contained food item) away from pot bottom 66. Basket 80 can be lifted and manipulated using handles 85, 86.

The following is a list of suitable parts and materials for the various elements of the preferred embodiment of the present invention.

| PARTS LIST | |
|---|---|
| Parts Number | Description |
| 10 | outdoor cooking apparatus |
| 11 | burner frame |
| 12 | pot |
| 13 | base |
| 14 | u-shaped leg |
| 15 | u-shaped leg |
| 16 | vertical section |
| 17 | vertical section |
| 18 | horizontal section |
| 19 | vertical section |
| 20 | vertical section |
| 21 | horizontal section |
| 22 | bend |
| 23 | bend |
| 24 | shroud |
| 25 | grate member |
| 26 | grate member |
| 27 | grate member |
| 28 | grate member |
| 29 | burner element |
| 30 | burner support bracket |
| 31 | weld |
| 32 | bend |
| 33 | end portion |
| 34 | end portion |
| 35 | inner cylindrical surface |
| 36 | rectangular upper section |
| 37 | horizontal bar |

-continued

PARTS LIST

| Parts Number | Description |
|---|---|
| 38 | horizontal bar |
| 39 | horizontal bar |
| 40 | horizontal bar |
| 41 | hose |
| 42 | bolted connection |
| 43 | fitting |
| 44 | open top |
| 45 | concrete slab |
| 46 | pot rim |
| 47 | pot interior |
| 48 | handle |
| 49 | handle |
| 50 | poultry cooking insert |
| 51 | longitudinal beam |
| 52 | transverse beam |
| 53 | vertical beam |
| 54 | vertical beam |
| 55 | lifting hook |
| 56 | lifting hook |
| 57 | poultry skewer |
| 58 | Poultry skewer |
| 59 | threaded end |
| 60 | hanger |
| 61 | hook |
| 62 | curved member |
| 63 | poultry carcass |
| 64 | end panel |
| 65 | end panel |
| 66 | bottom panel |
| 67 | trapezoid section |
| 68 | trapezoid section |
| 69 | rectangular section |
| 70 | rectangular section |
| 71 | side |
| 72 | side |
| 73 | inclined panel |
| 74 | vertical panel |
| 75 | horizontal seam |
| 76 | dimension |
| 77 | end |
| 78 | dimension |
| 79 | steamer plate |
| 80 | basket |
| 81 | frame |
| 82 | foot |
| 83 | wire cloth |
| 84 | inside contour |
| 85 | handle |
| 86 | handle |
| 87 | internally threaded opening |
| 88 | thickened section |
| 89 | opening |

The foregoing embodiments are presented by way of example only; the scope of the present invention is to be limited only by the following claims.

The invention claimed is:

1. An outdoor cooking apparatus comprising:
   a) a burner frame having upper and lower end portions, the lower end portion being configured to engage an underlying support surface and the frame providing a pot support;
   b) a burner element mounted on the frame;
   c) a pot that rests upon the pot support during cooking, the pot having a bottom panel of a first area, a plurality of sidewalls, an open top of a second area, an interior for holding a cooking fluid having a cooking fluid level, and a pot rim;
   d) first and second separate, selectively connectable components that are each sized and shaped to fit the pot interior, wherein the first and second components are selectively separable or connectable in first and second food supporting configurations, wherein in the first food supporting configuration the first and second components are connected and the first said component is positioned above and supported by the second component;
   e) wherein in the first food supporting configuration the first component includes a perforated portion for holding food elevated above the pot bottom panel above said cooking fluid level while allowing fluid flow through its perforations via gaseous fluid flow, said first component having a periphery;
   f) wherein the second component is a food holding component having first and second spaced apart upwardly facing U-shaped food holding concave members that are each sized and shaped to receive and hold a poultry article to be cooked in said second food supporting configuration, wherein the poultry article is in contact with the upwardly facing food holding concave members, wherein the concave members of the second food holding component are configured to support said poultry article in the second food supporting configuration below said fluid level when said second component is not a part of nor connected to the first component;
   g) the said U-shaped concave members of the second component, in the first food supporting configuration, having first and second pairs of arms with arm free ends that engage said periphery and hold the first component in an elevated position above the pot bottom panel and below the pot rim;
   h) wherein the second component has a lower end portion which is in contact with the bottom panel of the pot during both the first and second food supporting configurations; and
   i) wherein the said U-shaped concave members have upper free end portions that support the first component above the fluid level in the first food supporting configuration.

2. The outdoor cooking apparatus of claim 1 wherein the second component has one or more hangers that extend upwardly, enabling the second component to be lifted by lifting the hangers.

3. The outdoor cooking apparatus of claim 1 wherein, in the second food supporting configuration, the second component includes a plurality of vertically extending members, each of which are detachably connectable to the second component and each of which are skewering rods for vertically holding a plurality of poultry items, one on each of the plurality of vertically extending members.

4. The outdoor cooking apparatus of claim 1 wherein the second component has opposed end portions and a lifting member at each end portion.

5. The outdoor cooking apparatus of claim 1, wherein, in the second food supporting configuration, the second component includes at least one horizontally extending member which is detachably connectable to the second component and which holds the poultry article in a generally horizontal position during cooking in a cooking medium, and preventing the poultry article being cooked from floating in the cooking medium during the cooking process.

6. The cooking apparatus of claim 1 wherein the first component includes a steamer plate, which steamer plate is detachably connectable to the second component, and when in the first food supporting configuration, the second component is in contact with the bottom panel of the pot during the cooking process.

7. The cooking apparatus of claim 5, wherein the second component has a second horizontally extending member which is generally aligned with the at least one horizontally extending member, wherein the at least one horizontally extending member and the second horizontally extending member together hold the poultry article in a generally horizontal position during cooking.

8. The cooking apparatus of claim 3, wherein four vertically extending members are provided at spaced apart positions, each of which hold vertically a poultry member.

9. The cooking apparatus of claim 5, wherein the at least one horizontally extending member is generally V-shaped and the V-shape is generally horizontal.

10. The cooking apparatus of claim 1, wherein the second component includes a plurality of hooks which detachably connect to the pot rim, and when connected to the pot rim, hold the second component at a vertically elevated draining position relative to the pot above any cooking medium in the interior of the pot.

11. The cooking apparatus of claim 10, wherein the plurality of hooks are angled relative to the second component causing the second component to be inclined relative to the sidewall of the pot.

12. The cooking apparatus of claim 10, wherein the second component includes upper and lower ends, and the plurality of hooks are located at the lower end of the second component and are in contact with the bottom panel of the pot.

13. An outdoor cooking apparatus comprising:
   a) a burner frame having upper and lower end portions, the lower end portion being configured to engage an underlying support surface and the upper end portion providing a pot support;
   b) a burner element mounted on the frame;
   c) a pot that rests upon the pot support during cooking, the pot having a bottom panel, a plurality of sidewalls, an open top, an interior for holding a cooking medium having a liquid cooking medium surface, and a pot rim;
   d) a food holding insert having a base, a pair of spaced apart U-shaped concave poultry holders on said base and a plurality of hooks attached to the base which hooks can detachably connect the insert to the pot rim, and when detachably connected to the pot rim the plurality of hooks hold the food holding insert at a vertically elevated position relative to the bottom panel of the pot, and at the same time the elevated position is above the cooking medium, the food holding insert further having a plurality of detachably connectable components providing multiple food holding configurations;
   e) a first food holding configuration, wherein the pair of U-shaped spaced apart concave holders cradle a food item placed upon the concave holders, each concave holder including a pair of arms, each arm having a free end, and wherein the insert is in contact with the bottom panel of the pot;
   f) a perforated steamer plate having a periphery and that is connectable to the food holding insert at an elevated position that places the steamer plate above both the food holding insert and the liquid cooking medium surface;
   g) a second food holding configuration, wherein the perforated steamer plate is vertically supported by the free ends of the said concave holders at a vertically elevated position above the bottom panel of the pot, wherein the free ends of the arms of each concave holder connects to the perforated steamer plate at the said periphery;
   h) wherein in said second food holding configuration the perforated steamer plate is vertically elevated above the liquid cooking medium surface and below the pot rim, and the food holding insert is in contact with the bottom panel of the pot;
   i) a third food holding configuration, wherein the perforated steamer plate is not vertically supported by the concave holders, wherein a plurality of generally vertically extending food supports are detachably connected to the base, and each generally vertically extending food support is configured to hold a poultry item to be cooked in the cooking medium, and wherein the insert is in contact with the bottom panel of the pot; and
   j) a fourth food holding configuration, wherein the perforated steamer plate is not vertically supported by the concave holders and the plurality of generally vertically extending supports are not connected to the base, wherein a generally horizontally extending food holding support is detachably connected to the base, and which said generally horizontally extending food holding support horizontally holds a poultry item to be cooked in the cooking medium.

14. The outdoor cooking apparatus of claim 13, wherein the insert has one or more hangers that extend upwardly, enabling the insert to be lifted by lifting the hangers, and the steamer plate includes a plurality of openings wherein the hanger pass through the openings.

15. The outdoor cooking apparatus of claim 13, wherein four vertically extending members are provided at spaced apart positions, each of which hold vertically in a skewered relationship a poultry member, and wherein the generally horizontally extending member is generally V-shaped for holding in a skewered relationship a poultry member.

16. The outdoor cooking apparatus of claim 13, wherein the plurality of hooks are angled relative to the insert causing the insert to be inclined relative to the sidewall of the pot.

17. The outdoor cooking apparatus of claim 13, wherein the insert includes upper and lower ends, and the plurality of hooks are located at the lower end of the insert and are in contact with the bottom panel of the pot when the insert is located in the interior of the pot.

18. The outdoor cooking apparatus of claim 3, wherein each of the vertically extending members are spaced apart from each of the other vertically extending members.

* * * * *